United States Patent
Beardsley

(10) Patent No.: US 7,815,145 B2
(45) Date of Patent: Oct. 19, 2010

(54) MOUNTING SYSTEM FOR USE IN MOUNTING A GAS TURBINE ENGINE

(75) Inventor: Peter K Beardsley, Derby (GB)

(73) Assignee: Rolls-Royce PLC, London (GB)

( * ) Notice: Subject to any disclaimer, the term of this patent is extended or adjusted under 35 U.S.C. 154(b) by 85 days.

(21) Appl. No.: 11/650,849

(22) Filed: Jan. 8, 2007

(65) Prior Publication Data

US 2008/0105782 A1    May 8, 2008

(30) Foreign Application Priority Data

Feb. 4, 2006    (GB)    ................... 0602299.0

(51) Int. Cl.
B64D 27/00    (2006.01)
(52) U.S. Cl. ............................. 244/54; 60/796; 248/554
(58) Field of Classification Search ................... 244/54, 244/555–557; 60/796; 248/554
See application file for complete search history.

(56) References Cited

U.S. PATENT DOCUMENTS

| | | | | |
|---|---|---|---|---|
| 1,946,408 A * | 2/1934 | Loudy | .......................... | 403/64 |
| 2,410,450 A * | 11/1946 | Kroon | ........................ | 60/39.37 |
| 2,815,184 A * | 12/1957 | Irwin et al. | .................... | 244/54 |
| 4,044,973 A * | 8/1977 | Moorehead | .................. | 244/54 |
| 4,821,980 A * | 4/1989 | Clausen et al. | ................ | 244/54 |
| 4,854,525 A * | 8/1989 | Chee | .......................... | 244/54 |
| 5,065,959 A * | 11/1991 | Bhatia et al. | ................... | 244/54 |
| 5,409,184 A * | 4/1995 | Udall et al. | .................... | 244/54 |
| 5,443,229 A * | 8/1995 | O'Brien et al. | ............... | 244/54 |
| 5,452,575 A * | 9/1995 | Freid | ........................... | 60/797 |
| 5,725,181 A * | 3/1998 | Hey | ............................. | 244/54 |
| 5,740,674 A * | 4/1998 | Beutin et al. | ................. | 60/226.1 |
| 5,746,391 A * | 5/1998 | Rodgers et al. | ............... | 244/54 |
| 5,860,275 A * | 1/1999 | Newton et al. | ............. | 60/226.1 |
| 5,927,644 A * | 7/1999 | Ellis et al. | ...................... | 244/54 |
| 6,123,293 A * | 9/2000 | Breitbach et al. | ............. | 244/54 |
| 6,758,439 B2 * | 7/2004 | Harrison et al. | ............... | 244/54 |
| 6,935,591 B2 * | 8/2005 | Udall | .......................... | 244/54 |
| 7,159,819 B2 * | 1/2007 | Machado et al. | .............. | 244/54 |
| 2005/0082423 A1 * | 4/2005 | Whitmer et al. | ............... | 244/54 |
| 2005/0116093 A1 * | 6/2005 | Machado et al. | .............. | 244/54 |
| 2005/0178889 A1 * | 8/2005 | Machado et al. | .............. | 244/54 |
| 2006/0038066 A1 * | 2/2006 | Udall et al. | .................... | 244/54 |
| 2007/0228213 A1 * | 10/2007 | Diochon et al. | ............... | 244/54 |

FOREIGN PATENT DOCUMENTS

| | | |
|---|---|---|
| GB | 724052 | 2/1955 |
| GB | 737322 | 9/1955 |
| GB | 744473 | 2/1956 |
| GB | 755288 | 8/1956 |
| GB | 1030521 | 5/1966 |
| GB | 1074067 | 6/1967 |
| GB | 2 045 357 A | 10/1980 |
| GB | 2 375 513 A | 11/2002 |

\* cited by examiner

Primary Examiner—Tien Dinh
Assistant Examiner—Philip J Bonzell
(74) Attorney, Agent, or Firm—Oliff & Berridge, PLC

(57) ABSTRACT

A mounting system for use in mounting a gas turbine engine having an engine core to an aircraft comprises an engine support arrangement and front and rear mounting assemblies to mount the engine support arrangement to a casing surrounding the engine core. Each of the front and rear mounting assemblies comprises a plurality of circumferentially spaced mounting members to effect the aforesaid mounting of the engine support arrangement to the casing.

15 Claims, 4 Drawing Sheets

MOUNTING SYSTEM FOR USE IN MOUNTING A GAS TURBINE ENGINE

BACKGROUND

This invention relates to mounting systems for use in mounting gas turbine engines on to the fuselages of aircraft.

The mounting of gas turbine engines above the fuselage of an aircraft has advantages with respect to noise. However, there may be some issues concerning rotor failures that need to be addressed.

SUMMARY

According to one aspect of this invention, there is provided an aircraft comprising a gas turbine engine connected thereto via a pylon, the engine having a rotational axis, a core engine and a casing therearound, the gas turbine engine is attached to the aircraft via a mounting system, the mounting system comprises a frame arrangement, front and rear mount assemblies and a load spreading element, the frame arrangement connects to the front and rear mount assemblies that each comprise at least two circumferentially spaced apart mounting members to connect to the casing and the load spreading element extending across the frame arrangement includes three axially spaced connecting members which connect the load spreading element and, thereby, the frame arrangement and the engine, to the pylon.

Preferably, each of the front and rear mounting assemblies comprises three circumferentially spaced mounting members.

Preferably, the casing defines a bypass duct between the casing and the engine core to provide a path for the flow of air therethrough.

Preferably, the load spreading element is connected to the frame arrangement via three axially spaced apart connecting members.

Preferably, the load spreading element is elongate and extends across the frame arrangement.

Preferably, the frame arrangement comprises an arrangement of struts.

Advantageously, the casing is supported on the engine core by a plurality of A-frames.

Preferably, the A-frames are arranged in a warren truss arrangement.

Preferably, the A-frames are provided towards or at the rear of the engine core.

Preferably, the A-frames extend in a single plane generally circumferentially around the core.

Preferably, the rear mounting assembly is mounted on the casing in a plane of the A-frames.

BRIEF DESCRIPTION OF THE DRAWINGS

An embodiment of the invention will now be described by way of example only, with reference to the accompanying drawings, in which.

DETAILED DESCRIPTION OF EMBODIMENTS

Figure 1:
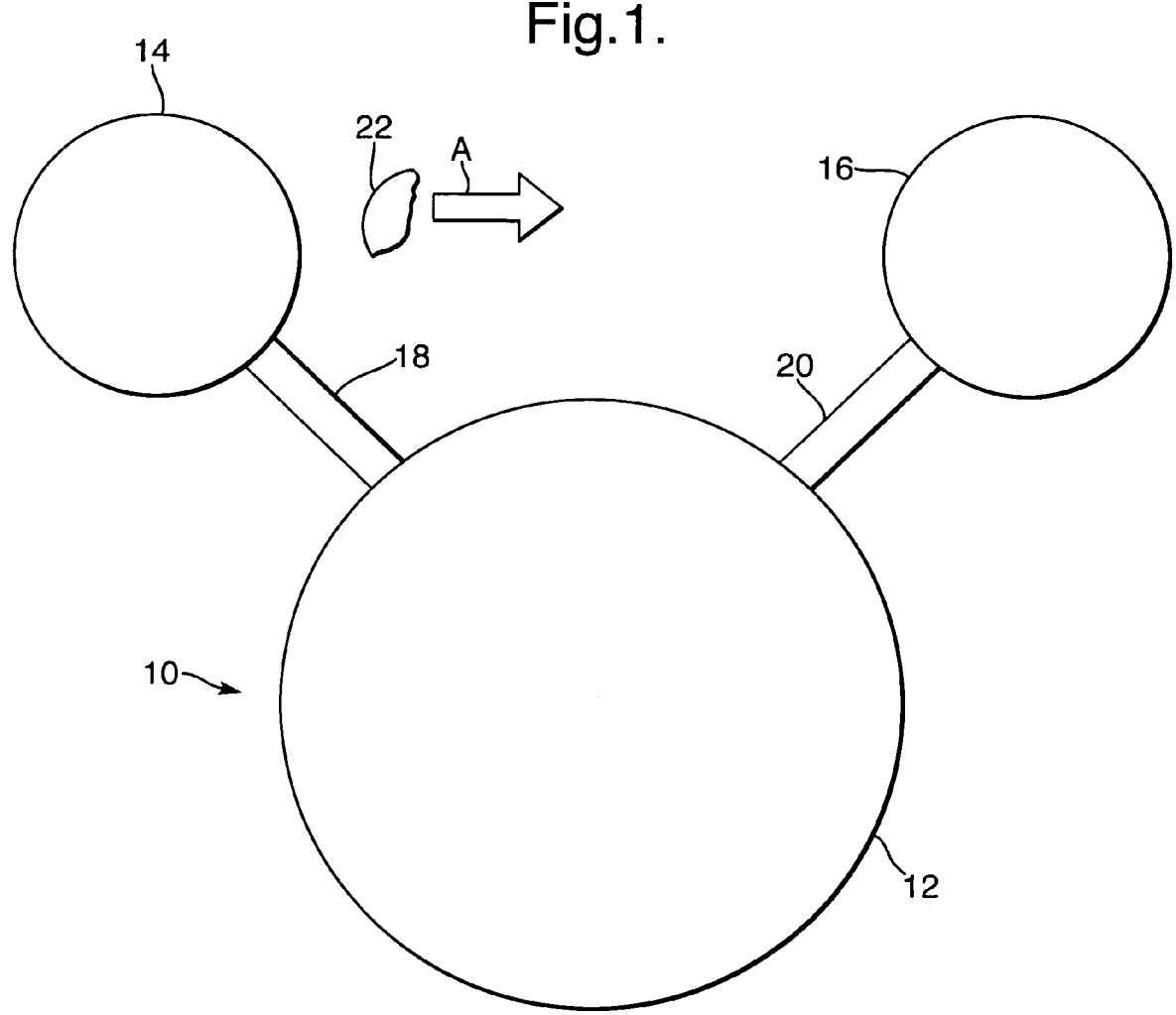
FIG. 1 is a diagrammatic front view of an aircraft showing the position of the engines.

Referring to FIG. 1, there is shown a diagrammatic rear view of an aircraft 10, with the wings and tail removed for clarity. The aircraft 10 comprises a fuselage 12 and two engines 14, 16 connected to the fuselage 12 by pylons 18, 20.

As can be seen, the engines 14, 16 are arranged above the fuselage and extend at an angle of between 30° to 60° to the horizontal. As a result, in the event of failure of one engine, there is a danger that the fragments of the failed component could strike the other engine. For example, as shown in FIG. 1, a fragment 22 of a disc of the engine 14 has broken therefrom and is directed towards the engine 16 as shown by the arrow A. It has been calculated that the failure of a disc causing it to break into a fragment of approximately a one third segment of a disc can cause the worst case ballistic impact.

Figure 2:
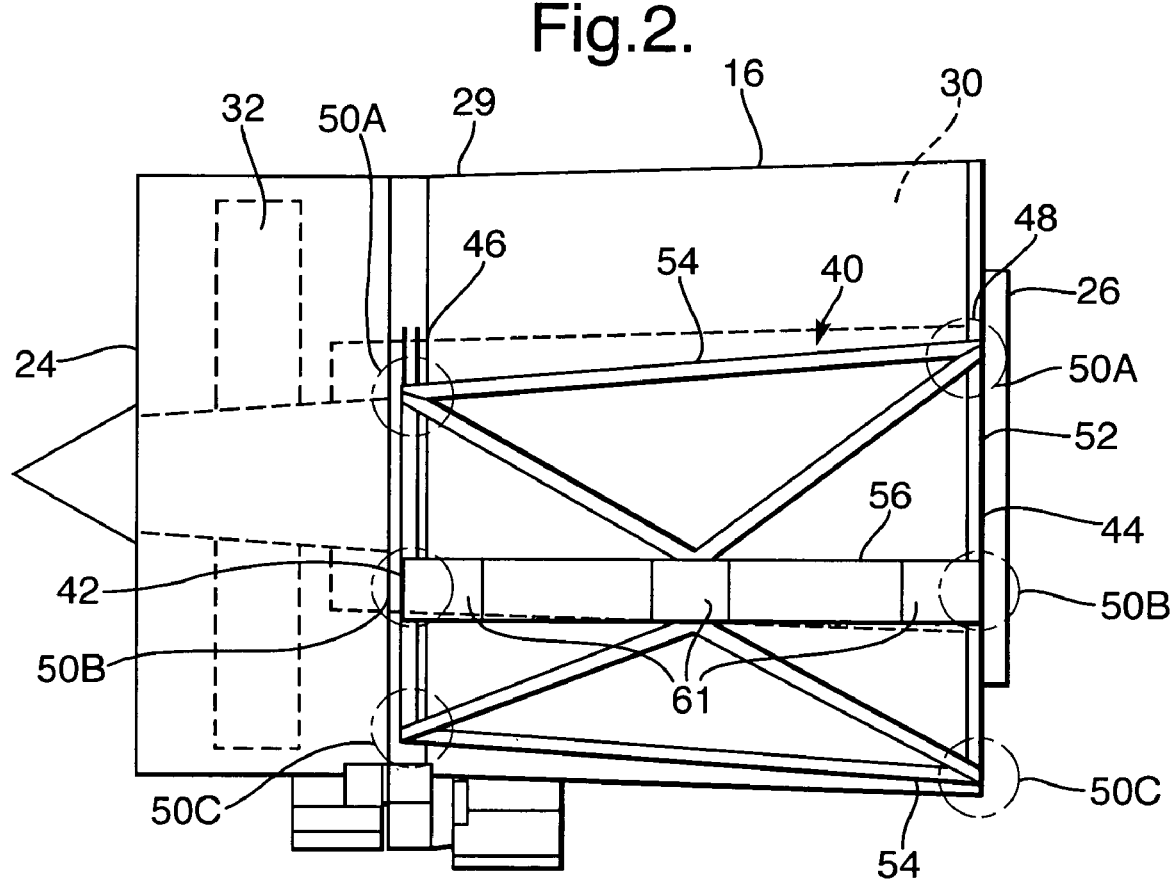
FIG. 2 is a side view of one of the engines shown in FIG. 2.

FIG. 2 shows the engine 16 having an upstream or front region 24 and a downstream or rear region 26. The engine 16 comprises a core 28 shown in broken lines, which is surrounded by a casing 29. The casing 29 defines with the core 28 a bypass duct 30. A fan 32 is provided towards the front 24 of the engine 16 and drives some of the air through the core 28 and the remainder of the air through the bypass duct 30 to provide the propulsive force. It will be appreciated that the structure of the engine 14 corresponds to the structure of the engine 16.

A mounting system 40 is provided on the casing 29 to enable the engine 16 to be attached to the fuselage 12 by the pylon 20 (not shown in FIG. 2).

The mounting system 40 comprises a front mounting assembly 42 and a rear mounting assembly 44. The front mounting assembly 42 is provided in a front mount plane 46, and the rear mounting assembly is provided in a rear mount plane 48. Each of the front and rear mounting assemblies comprises three mounting members 50A, 50B, 50C which are spaced from one another circumferentially around the respective front and rear mounting planes 46, 48.

The mounting system 40 further includes an engine support arrangement 52 in the form of a frame arrangement comprising a plurality of struts 54 in the form of a warren truss arrangement. A load spreading element in the form of an elongate brace 56 extends across the mounting system 40, and can provide the support to the struts 54. Each of the connecting members 50A, 50B, 50C comprises a link 58 (see FIG. 3) which connects the frame arrangement 52 to lugs 60 provided on the casing 29.

The mounting members 50A, 50B, 50C are spaced from each other by a distance which is greater than one third of the circumference of the largest disc. Since the breaking off of one third of a disc is calculated to provide the greatest ballistic impact, by spacing the mounting members 50A, 50B, 50C from one another by a distance greater than this dimension, the impact of the disc cannot occur on more than one of the mounting members. As a result, a fragment of a disc striking the mounting system 40 can, at worse, strike only one of the mounting members 50A, 50B or 50C. In such a case, the load from the engine is 10 is borne by the remaining mounting members.

The brace 56 extending across the frame arrangement 52 includes three axially spaced connecting members 61 which connect the brace 56 and, thereby, the frame arrangement 58 and the engine 16, to the pylon 20 to provide the connection of the engine 16 to the fuselage 12.

Figure 3:
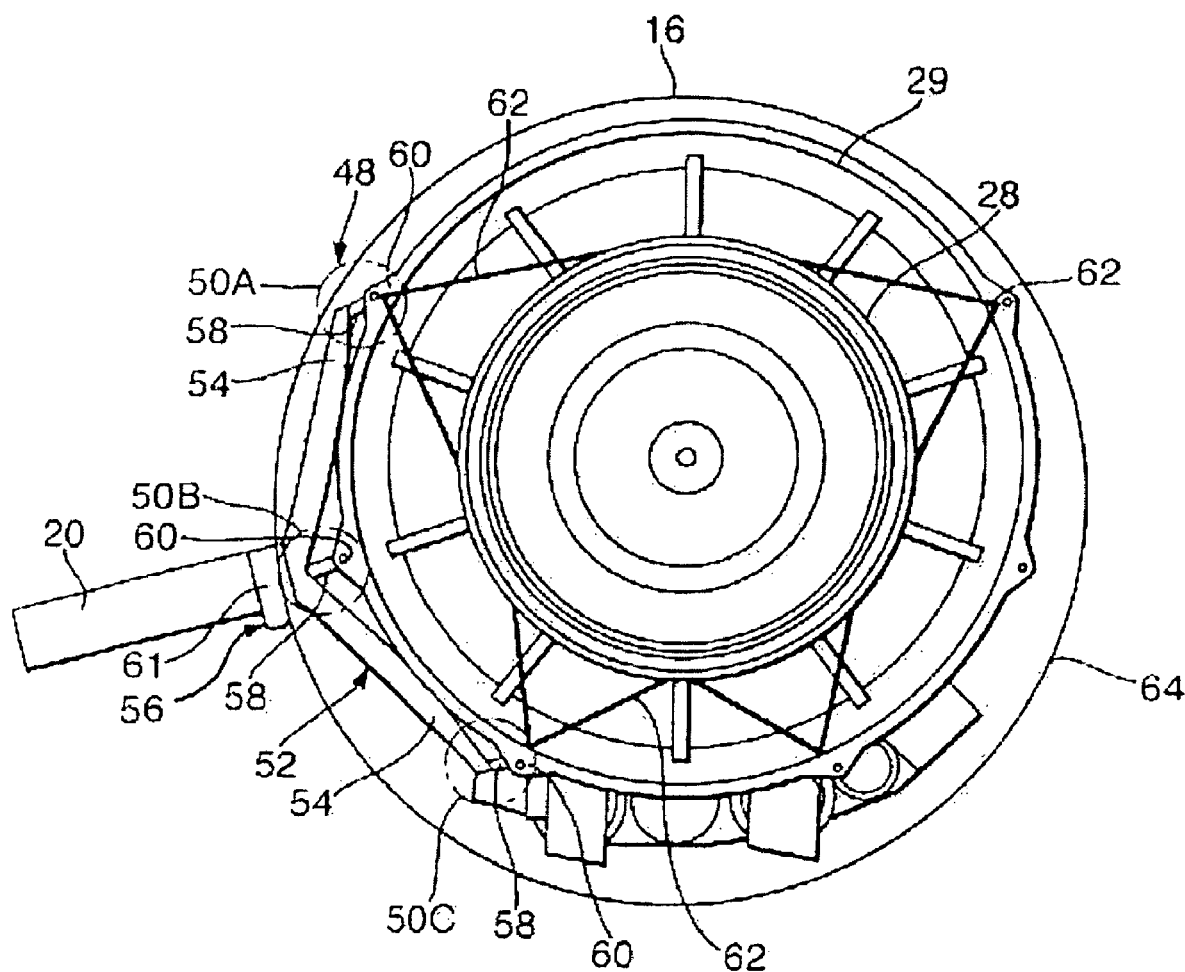
FIG. 3 is a rear view of the engine shown in FIG. 2.

Referring particularly to FIG. 3 which shows a rear view of the engine 16, it can be seen that the rear core 28 is connected to the casing 29 by means of a plurality of A frames 62. The A frames 62 extend in substantially the same plane around the casing 29. The rear mount plane 48 can be arranged in the same plane as the A frames 62 and the two outer connecting members 50A can be connected to the casing 29 in the regions of two of the A frames 62. This provides further strength for supporting the engine 16.

Still referring to FIG. 3, the casing 29 is surrounded by hinged cowls 64, which can be opened to allow maintenance on the engine 16. The brace 56 supports the hinges for the cowls 64.

Figure 4:
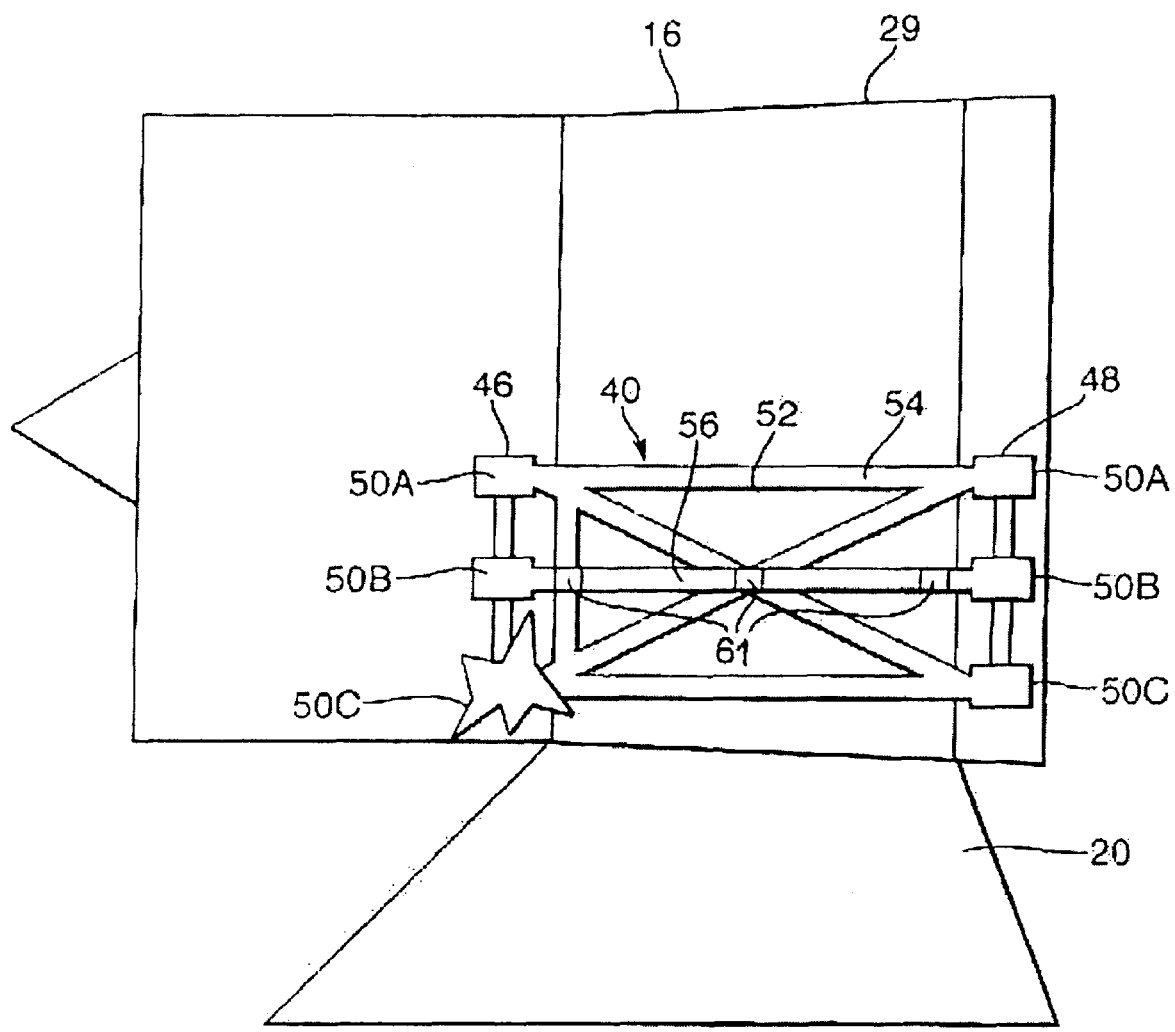
FIG. 4 is a side view showing an impact on a mounting member.

Referring to FIG. 4, there is shown a further drawing of the engine shown in FIG. 2, in which the mounting member 50C in the front mounting plane 56 has been struck by a failed component, such as a fragment of a disc, of the other engine on the aircraft. As a result of the failure of the front mounting member 50C, the frame arrangement 52 transmits the load that was supported by the front mounting member 50C on to the two remaining mounting members 50A, 50B in the front plane 46. The plane arrangement 52 also transferred some of this load to the three mounting members 50A, 50B, 50C in the rear mounting plane 48.

Various modifications can be made without departing from the scope of the invention, for example, the frame arrangement 52 could be replaced by an arrangement of beams riveted together, which may be in the form of a generally monolithic structure, or by any other suitable support arrangement.

The invention claimed is:

1. An aircraft comprising
   a gas turbine engine connected to the aircraft via a pylon,
      the engine having:
         a rotational axis,
         a core engine, and
         a casing around the core engine,
      the gas turbine engine is attached to the aircraft via a mounting system, the mounting system comprising:
         a frame arrangement comprising an arrangement of struts,
         front and rear mount assemblies that each comprise at least two circumferentially spaced apart mounting members to connect to the casing, and
         a load spreading element including a first side and a second side and extending across the frame arrangement,
      the frame arrangement connects to the front and rear mount assemblies, and
      the load spreading element includes three axially spaced connecting members which connect the load spreading element and, thereby, the frame arrangement and the engine to the pylon,
   wherein the load spreading element is disposed along an end of the pylon between the pylon and the frame arrangement and the pylon is on the first side of the load spreading element and the frame arrangement is on the second side of the load spreading element.

2. An aircraft according to claim 1, wherein each of the front and rear mounting assemblies comprises three circumferentially spaced mounting members.

3. An aircraft according to claim 1, wherein the casing defines a bypass duct between the casing and the engine core to provide a path for the flow of air therethrough.

4. An aircraft according to claim 1, wherein the load spreading element is elongate and extends across the frame arrangement.

5. An aircraft according to claim 1, wherein the struts are arranged in a warren truss arrangement.

6. An aircraft according to claim 1, wherein the load spreading element is disposed perpendicular to a direction that the pylon extends between the turbine engine and a fuselage.

7. An aircraft according to claim 1, wherein the frame arrangement and the load spreading element are disposed outside of the pylon.

8. An aircraft according to claim 1, wherein the load spreading element is disposed outside of the pylon.

9. An aircraft according to claim 1, wherein the three axially spaced connecting members include a central connecting member, and
   a strut of the arrangement of struts extends between the central connecting member and either the front mounting assembly or the rear mounting assembly.

10. An aircraft according to claim 1, wherein a strut of the arrangement of struts extends between the front mounting assembly and the rear mounting assembly.

11. An aircraft according to claim 1, wherein the three axially spaced connecting members include a central connecting member,
   a first strut of the arrangement of struts extends between the central connecting member and either the front mounting assembly or the rear mounting assembly, and
   a second strut of the arrangement of struts extends between the front mounting assembly and the rear mounting assembly.

12. An aircraft according to claim 1, wherein the casing is supported on the engine core by a plurality of A-frames.

13. An aircraft according to claim 12, wherein the A-frames are provided towards or at the rear of the engine core.

14. An aircraft according to claim 12, wherein the A-frames extend in a single plane generally circumferentially around the core.

15. An aircraft according to claim 12, wherein the rear mounting assembly is mounted on the casing in a plane of the A-frames.

* * * * *